United States Patent
Klein et al.

(10) Patent No.: US 12,061,023 B2
(45) Date of Patent: Aug. 13, 2024

(54) WATER-BASED REFRIGERANT FOR A THERMAL WORKING MACHINE AND THERMAL WORKING MACHINE HAVING SUCH A REFRIGERANT

(71) Applicant: Steffen Klein, Schorndorf (DE)

(72) Inventors: Steffen Klein, Schorndorf (DE); Ralf Steffens, Esslingen (DE)

(73) Assignee: Steffen Klein, Schorndorf (DE)

(*) Notice: Subject to any disclaimer, the term of this patent is extended or adjusted under 35 U.S.C. 154(b) by 518 days.

(21) Appl. No.: 17/474,320

(22) Filed: Sep. 14, 2021

(65) Prior Publication Data

US 2021/0404715 A1    Dec. 30, 2021

Related U.S. Application Data

(63) Continuation-in-part of application No. PCT/EP2019/072541, filed on Aug. 23, 2019.

(30) Foreign Application Priority Data

Mar. 31, 2019 (DE) ............ 10 2019 002 297.1

(51) Int. Cl.
*F25B 31/00* (2006.01)
*F25B 1/04* (2006.01)
(Continued)

(52) U.S. Cl.
CPC .............. *F25B 31/006* (2013.01); *F25B 1/04* (2013.01); *F25B 9/002* (2013.01); *F25B 49/005* (2013.01); *F25B 2400/0409* (2013.01)

(58) Field of Classification Search
CPC .......... F25B 31/006; F25B 1/04; F25B 9/002; F25B 45/00; F25B 49/005; F25B 2400/0409; F25B 47/006; C09K 5/041
See application file for complete search history.

(56) References Cited

U.S. PATENT DOCUMENTS

2009/0145143 A1* 6/2009 McMasters ............. F25B 45/00
                                                                   62/149
2012/0041608 A1* 2/2012 Zugibe .................... G06F 30/27
                                                                   700/285

(Continued)

FOREIGN PATENT DOCUMENTS

DE    10 2004 001 927 A1    8/2005
DE    10 2018 001 519 A1    8/2019

(Continued)

OTHER PUBLICATIONS

The International Search Report for the corresponding international application No. PCT/EP2019/072541, dated Apr. 1, 2020 in the German language (4 pages).

(Continued)

*Primary Examiner* — Kun Kai Ma
(74) *Attorney, Agent, or Firm* — Ronald S. Lombard

(57) ABSTRACT

A water-based refrigerant for a thermal working machine. The refrigerant for a thermal working machine (150) having an evaporator (A), a condenser (B), a compressor ($C_{GL}$), and a throttle element (D). The refrigerant is based on water and comprises a refrigerant component with a hydroxyl group, for example in the form of ethanol. The use of such a mixture as a refrigerant for a thermal working machine and for a thermal working machine having such a refrigerant, and to a method for operating a thermal working machine having such a refrigerant is also disclosed.

16 Claims, 8 Drawing Sheets

(51) Int. Cl.
    *F25B 9/00*          (2006.01)
    *F25B 49/00*        (2006.01)

(56) References Cited

U.S. PATENT DOCUMENTS

| | | |
|---|---|---|
| 2015/0260435 A1 | 9/2015 | Kawano et al. |
| 2017/0089342 A1* | 3/2017 | Steffens .................. F04C 18/54 |
| 2019/0061465 A1* | 2/2019 | HS ........................ G01G 13/248 |

FOREIGN PATENT DOCUMENTS

| | | | | |
|---|---|---|---|---|
| EP | 0813033 A2 * | 12/1997 | | |
| JP | H0861797 A * | 3/1996 | | |
| JP | 2001192684 A * | 7/2001 | ............. | C09K 5/041 |
| JP | 2003083644 A * | 3/2003 | ............. | F25B 13/00 |
| WO | WO 2006/087549 A2 | 8/2006 | | |
| WO | WO 2018/134200 A1 | 7/2018 | | |
| WO | WO-2019147364 A1 * | 8/2019 | ......... | B60H 1/00585 |

OTHER PUBLICATIONS

The English translation of the International Search Report dated Apr. 1, 2020 for the corresponding international application No. PCT/EP2019/072541 (4 pages).

\* cited by examiner

US 12,061,023 B2

WATER-BASED REFRIGERANT FOR A THERMAL WORKING MACHINE AND THERMAL WORKING MACHINE HAVING SUCH A REFRIGERANT

CROSS-REFERENCE TO RELATED APPLICATIONS

This is a continuation-in-part application of pending international application PCT/EP2019/072541 filed Aug. 23, 2019 and claiming the priority of German Application No. 10 2019 002 297.1 filed Mar. 31, 2019. The aforesaid pending international application PCT/EP2019/072541 and German Application No. 10 2019 002 297.1 are both incorporated herein by reference as though fully set forth.

BACKGROUND OF THE INVENTION

The invention relates to a water-based refrigerant for a thermal working machine 1, the use of such a refrigerant, a thermal working machine, and a method for operating a thermal working machine according to the claims.

A thermal working machine, in which mechanical energy is converted into thermal energy, for example a refrigerating machine or a heat pump, requires a refrigerant that undergoes temperature and state changes during operation. Because of their good thermodynamic properties, fluorocarbons such as tetrafluoroethane, which is also referred to refrigerant R134a, were frequently used. Primarily due to their effect as so-called greenhouse gases, refrigerants with a low greenhouse warming potential must be found for the future. The search for such refrigerants focuses primarily on natural coolants, which include ammonia, carbon dioxide, air, propane, propene, and water. The advantages of natural coolants are, in particular, their environmentally friendly properties. They do not contribute to the depletion of the ozone layer and do not cause any appreciable direct greenhouse effect.

DE 10 2004 001927 A1 describes a thermal working machine in the form of a heat pump in which water is used as a refrigerant. Water is referred to as refrigerant R718. As is known, it has the property of freezing at 0° C., which means it turns into ice. Ice would hinder and block the thermal working machine. A thermal working machine using water as the refrigerant can therefore only be operated at temperatures above the freezing point.

The described restriction of the range of use to temperatures greater than 0° C. limits the potential uses of a thermal working machine that uses water as the refrigerant. For example, a heat pump for heating a house, at least in central Europe, could not be operated with water as a refrigerant because temperatures below the freezing point can be expected in central Europe. Even at ambient temperatures above 0° C., it would be impossible to cool a room or a working medium to a temperature below 0° C. The minimum of the lowest ambient temperature and the lowest room or working medium temperature can be referred to as the lower limit of the range of use of the refrigerant. The maximum of the highest ambient temperature and the highest room or working medium temperature can be referred to as the upper limit of the range of use of the refrigerant.

With this in mind, it is the object of the invention to propose a refrigerant for a thermal working machine and a thermal working machine having the lowest negative impact possible on the environment and the largest range of use as possible. This object is achieved with a refrigerant and a thermal working machine according to the claims.

SUMMARY OF THE INVENTION

The refrigerant according to the invention for a thermal working machine having an evaporator, a condenser, a compressor, and a throttle element is based on water and comprises a refrigerant component with a hydroxyl group, i.e. an OH group or hydrogen-oxygen group. In this manner, the freezing point, i.e. the temperature at which the refrigerant passes from the liquid to the solid state, can be shifted to a temperature range below the freezing point of pure water, i.e. 0° C. The thermal working machine can thus also advantageously be used at temperatures below 0° C. and also cool rooms or working media to a temperature below 0° C. The range of use of water as a refrigerant, i.e. as refrigerant R718, can thus be expanded advantageously.

The use of the refrigerant according to the invention as intended is thus the use of a mixture of water and a refrigerant component having a hydroxyl group as a refrigerant for a thermal working machine having an evaporator, a condenser, a compressor, and a throttle element.

A water-based refrigerant is understood to be a refrigerant that at least contains a non-negligible amount of water. In particular, the water content is above 50%. However, it is also possible for special applications that the water content is less than 50%, for example only 10% or only 1%. The percentages are specified, as all other percentages in the following, with respect to the mass of the refrigerant, meaning they are percentages by mass and not percentages by volume.

A thermal working machine shall be understood here as a machine which converts mechanical energy into thermal energy. The thermal working machine is designed in particular as a refrigeration machine, a heat pump, or a combination of a refrigeration machine and a heat pump.

The refrigerant according to the invention can contain other components in addition to the aforementioned refrigerant component with a hydroxyl group.

The proportion of the refrigerant component can be adapted to a planned application of the refrigerant, i.e. it can be selected depending on the application. As a general rule, the lower the lower limit of the planned operating range of the thermal working machine, the higher the proportion of the refrigerant component containing a hydroxyl group.

In an embodiment of the invention, said refrigerant component comprises a hydroxyl group of an alcohol, in particular a monohydric alcohol, and specifically ethanol having the molecular formula $C_2H_6O$ or the structural formula $C_2H_5OH$, or else propan-1-ol having the molecular formula $C_3H_8O$ or the structural formula $C_3H_7OH$. Mixtures of different alcohols are also possible. Alcohols, in particular monohydric alcohols, i.e. alcohols having only one OH group, and especially ethanol and propan-1-ol, have some properties having a positive effect when used as a refrigerant component. They have a low freezing point (about −114.5° C. for ethanol, and about −126° C. for propan-1-ol), are readily soluble in water, are not harmful or only slightly harmful to your health, and are not hazardous or only slightly hazardous to the environment.

In an embodiment of the invention, said refrigerant content comprises at least 10%, in particular at least 20%, and especially at least 30%, of the total amount of refrigerant. In this manner, it is possible to achieve a particularly advantageous expansion of the range of use of the refrigerant. For example, when ethanol is used, the lower limit of the range of use can be shifted with a proportion of 10% to about −5° C., with a proportion of 20% to about −10° C., and with a proportion of 30% to about −19° C.

By further increasing the proportion of refrigerant to 40% or 50%, for example, it is possible to shift the lower limit of the range of use further to even lower temperatures, for example with an ethanol proportion of 40% to approx. −30° C., and for a proportion of 50% to approx. −37° C.

In an embodiment of the invention, the proportion of the aforementioned refrigerant content having a hydroxyl group with respect to the total refrigerant content is at most so high that the refrigerant is non-flammable. There is thus no risk of the refrigerant catching fire, which makes the refrigerant especially safe to handle and makes the refrigerant especially safe to use. In addition, the handling of non-flammable substances is much simpler and less complex, and thus more cost-effective, when compared to the handling of flammable substances.

In particular, the refrigerant is non-flammable under the conditions prevailing during the operation of the thermal working machine, i.e. it is non-flammable under so-called operating conditions. There is thus no risk of the refrigerant igniting in the thermal working machine during operation. The conditions relate in particular to the prevailing pressure and temperature.

The refrigerant is alternatively or additionally non-flammable under standard conditions. In this manner, there is no risk of the refrigerant igniting during transport, storage, or introduction into the thermal refrigeration machine.

The maximum proportion of the refrigerant component having a hydroxyl group for maintaining the stated condition depends on the refrigerant used, for example the type of alcohol, and can be determined, for example, through simple experiments. When ethanol is used, the maximum proportion is, for example, between 40% and 45%. Normal conditions are understood to be the standard chemical conditions, i.e. a temperature of 0° C. and a pressure of 1013.25 mbar.

However, it is also possible for the proportion of refrigerant with a hydroxyl group with respect to the total refrigerant content to be so high that the refrigerant is flammable under normal conditions. The flammability can be considered acceptable, for example, when the lower limit of the range of use is at a very low temperature and alternative refrigerants have additional or more serious disadvantages, for example they are also explosive. For example, an ethanol content of 90% can be used when the lower limit of the range of use is −110° C.

The aforementioned object is also achieved by a thermal working machine with an evaporator, a condenser, a compressor, a throttle element, and a refrigerant circuit with a refrigerant as described above.

In an embodiment of the invention, the thermal working machine has a refrigerant adjusting device, by means of which the proportion of refrigerant with the hydroxyl group can be changed during the operation of the thermal working machine. By changing the proportion of refrigerant with the hydroxyl group, meaning the proportion of refrigerant having a hydroxyl group with respect to the total refrigerant content, it is possible to change the lower limit of the range of use during operation. It is thus possible during operation to react to changes in environmental or boundary conditions of the thermal working machine without having to interrupt the operation of the thermal working machine. The refrigerant adjusting device is designed in particular in such a manner that pure water, pure refrigerant having a hydroxyl group, or a mixture thereof can be added to the refrigerant mixture. The refrigerant adjusting device can have a measuring device, for example a refractometer, by means of which it is possible to determine the proportion of refrigerant having a hydroxyl group. It is therefore possible to adjust or control the desired proportion of refrigerant with a hydroxyl group.

In an embodiment of the invention, all the electrical components of the thermal working machine are designed to be explosion-proof. This enables particularly safe operation of the thermal working machine. The electrical components of the thermal working machine are understood here to be, for example, the motor(s), in particular electric motors for driving the compressor, and the necessary wiring, control devices, sensors, etc. An explosion-proof design is understood in particular as a design complying with the ATEX Directive 2014/34/EU. In this case, for example, the motor windings of electric motors are cast in plastic, and cable glands are designed to be gas-tight, for example also cast.

In an embodiment of the invention, the compressor is designed as a two-shaft rotary displacement machine having a first spindle rotor that can be rotated about a first support shaft and a second spindle rotor that can be rotated about a second support shaft and which are mounted by means of bearings operated with the refrigerant. Such a two-shaft rotary displacement machine is described, for example, in the non-prepublished German patent application with the application number DE 10 2018 001 519.0.

When a refrigerant containing a refrigerant component having a hydroxyl group is used, very high vacuum-specific compression ratios are required, for example, to compress from a pressure of 2 mbar to 200 mbar. Such compression ratios are currently technically feasible only with multi-stage rotary vacuum displacement machines. The so-called "spindle compressor" is designed as a two-shaft rotary displacement machine, which functions like a multi-stage screw compressor. The spindle compressor is operated in particular as a so-called "dry runner", whereby the working chamber preferably operates without operating fluid, usually using electronic synchronization to ensure the two spindles do not come into contact with each other. In this case, each spindle rotor has its own drive (motor) which is operated electronically in such a manner that the two spindle rotors do not touch each other during operation.

The bearing of the spindle rotors using sliding bearings, which are operated with refrigerants, makes it possible to dispense with lubricants, in particular fats or oils, in the bearing. There is therefore no risk of the lubricant becoming diluted or being washed out a bearing, which can occur, for example, when refrigerant condenses in the bearing. The washing out or dilution of the bearing lubricant can lead to damage to the bearing, and thus to the failure of the compressor, and thus to the failure of the entire thermal working machine. The use of said sliding bearings therefore leads to particularly reliable operation of the compressor, and thus of the entire thermal working machine.

For example, when the spindle rotors are mounted with sliding bearings, radial forces are rotatably supported with a small support length on each end of the spindle rotor via bearing bushes on a stationary and continuous support shaft, and the axial forces of each spindle rotor are also absorbed by this support shaft via the axial sliding bearings of a support ring fixed to the frame. Each support shaft is fastened to the compressor housing via axle supports with cantilevers. Separation between the pressure $p_1$ at the compressor inlet and the pressure $p_2$ at the compressor outlet on the continuous support shaft is preferably achieved on the axial refrigerant slide thrust bearing in such a manner that the higher pressure $p_2$ is applied to the larger radius and the lower pressure $p_1$ is applied to the smaller radius.

For example, to electronically synchronize a pair of motors and spindle rotors, the drive for each spindle rotor is designed as an external rotor motor drive unit, preferably as a synchronous motor. Its motor stator is also mounted with its windings on said support shaft for rotation therewith, whereby its motor rotor rotatably drives the spindle rotor via torque, wherein the heat loss of the motor is substantially dissipated via an axle refrigerant cooling system.

In order to improve the heat balance during operation, the external rotor motor in particular is subject to the pressure $p_1$ on the compressor inlet, and its motor cables are fed out in particular through a hole in the support shaft to the inlet side of the compressor.

Each spindle rotor is designed in particular with a support tube in such a way that the required bending stiffness is achieved in terms of the desired high critical bending speed, wherein a feed screw rotor with a gas-conveying external thread is seated on each support tube for rotation therewith, which is carried out in an application-specific manner (i.e. for special temperature requirements) with cylindrical internal rotor evaporator cooling subject to the pressure $p_1$ at the compressor inlet with a refrigerant supply by means of a feed tube and refrigerant vapor outlet on the inlet side of the compressor.

The external feed screw thread of each spindle rotor is designed in such a manner that the angle at the root circle along the rotor axis lies within a range between 0° and preferably below 8°.

In each spindle rotor, the support shaft is held for rotation therewith at each end via axle supports, whereby the axial is preferably positioned by means of shaft nuts and/or peeling disks, in particular for the targeted adjustment of the play between the spindle rotor head and the compressor housing working chamber hole via the non-cylindrical outer shape of the spindle rotor.

Each spindle rotor is designed in particular as a completely assembled and completely balanced rotation unit, wherein so-called emergency synchronization gears are positioned on the outlet side of the compressor.

In an embodiment of the invention, the first spindle rotor is driven by a first drive machine, the second spindle rotor is driven by a second drive machine, and the said refrigerant is used in order to cool at least one of the drive machines, in particular both drive machines. A particularly effective cooling of the drive machines is thus possible without having to use a special coolant. The refrigerant can also at least partially evaporate, which leads to a particularly effective dissipation of the heat loss of the drive machine.

In an embodiment of the invention, the compressor has at least one, in particular a plurality of, and especially four pitot tube pumps, by means of which refrigerant fed into the compressor is discharged from the compressor. In this manner, refrigerant can be removed from the compressor in a simple and effective manner. The pitot tube pump or the pitot tube pumps can additionally relieve a refrigerant pump for generating pressurized refrigerant. The pressurized refrigerant is fed to the sliding bearings in order to maintain the necessary hydrostatic pressure in the sliding bearing. The refrigerant pump is in particular fed via a collection tank which is arranged geodetically over the refrigerant pump. The pitot tube pumps convey the refrigerant discharged by the compressor, in particular into the collection tank. The collection tank is designed in particular as a closed container in which pressure can be built up.

The refrigerant pump is regulated in a specific manner in terms of the pressure and volume flow and in terms of the temperature via the heat exchanger in such a manner that the bearing losses are minimized.

A pitot tube pump has a pitot tube, which is arranged in a stationary manner and submerges into a liquid rotating at high speed (pitot tube pressure principle). When the liquid enters the stationary pitot tube, the energy of velocity is converted into pressure.

The pitot tube pump or each of the pitot tube pumps are fed in particular via a collection channel, which extends around the corresponding support shaft and is designed and arranged in such a manner that refrigerant located in the compressor collects in the collection channel during operation of the compressor. In this manner, no further measures are necessary to convey the refrigerant into the collection channel. In addition, the refrigerant can be removed particularly effectively, and the pitot tube pump or pitot tube pumps can build up a particularly high pressure, which leads to particularly good support of said refrigerant pump.

The refrigerant used for cooling can be located within a specified area inside the compressor. For this purpose, the collection channel is arranged radially, in particular with respect to the corresponding support shaft, on the outermost side within the specified area mentioned so that the refrigerant, which has been set in rotation, collects in the cooling channel without requiring any further measures.

For example, the depth of the bent end of each pitot tube in the collection channel is set to produce a gap between said bent end and the bottom of the collection channel by rotating the bent end of pitot tube during assembly to specifically set an immersion depth into the refrigerant ring in the collection channel produced by the centrifugal forces in such a manner, by means of the number and positioning of the pitot tube pumps, the conveyed refrigerant quantity is always in equilibrium with the refrigerant supply quantities of each side of the spindle rotor, whereby the collection channel is filled with refrigerant from the refrigerant sliding bearings, and this refrigerant forms a refrigerant ring in the collection channel by means of the centrifugal forces, which exhibits a collection channel refrigerant radius on the surface.

In an embodiment of the invention, the compressor is designed as a two-shaft rotary displacement machine having a first spindle rotor that can be rotated about a first support shaft and a second spindle rotor that can be rotated about a second support shaft and which are mounted by means of rolling bearings, whereby the rolling bearings are protected from contact with the refrigerant by feeding a supply of protective gas. In this manner, technically sophisticated and cost-effective rolling bearings can be used advantageously without the risk of washing out or diluting the lubricants of the rolling bearings in the form of grease or oil. Nitrogen can be used as a protective gas, for example.

The protective gas is fed into spaces adjacent to the rolling bearings, which can be referred to as so-called side spaces.

In an embodiment of the invention, the compressor has a neutral chamber from which the protective gas supplied is discharged, whereby evaporated refrigerant is fed to the neutral chamber so that a mixture of protective gas and evaporated refrigerant is removed or evacuated from the neutral chamber. The supply of evaporated refrigerant leads to a pressure increase of the protective gas/refrigerant vapor mixture, which leads to a low consumption of protective gas.

In an embodiment of the invention, the compressor has a blocking steam chamber, to which refrigerant is fed and which evaporates there, which is also connected to the neutral chamber. A brush seal, which is wetted with refrigerant, is used in the blocking steam chamber, for example, which is wetted in particular with warm, condensed refrigerant. The thermal energy required for evaporation is generated by the friction of the bristles on the rotating support shaft. This makes it possible to produce very simply evaporated refrigerant for feeding into said neutral chamber.

In an embodiment of the invention, protective gas is fed to the neutral chamber via a flow resistance on the side of the side space and/or evaporated refrigerant is fed to the neutral chamber via a flow resistance on the side of the working chamber. The consumption of protective gas and/or evaporated refrigerant can thus be advantageously reduced. The flow resistance can also be referred to as a flow braking system. It can be designed, for example, as a narrow gap, preferably with flow interruption resistors such as a series connection of a plurality of grooves that are as sharp as possible.

The pressures in the side spaces $p_s$ and in the neutral chamber $p_N$ are adjusted with respect to the pressure in the compressor working chamber $p_A$ in such a manner that the following pressure condition $p_S > p_A > p_N$ applies. Maintaining the pressure condition ensures that no refrigerant can come into a side space and thus into contact with a rolling bearing.

In an embodiment of the invention, the thermal working machine has a recycling device, to which the mixture of protective gas and evaporated refrigerant discharged from the neutral chamber is fed and which separates said mixture into protective gas and refrigerant. In this manner, the discharged mixture can be reused, which leads to cost-effective operation of the thermal working machine. Said mixture is recycled in the recycling device, for example through simple condensation, in that the respective constituents can be easily separated thanks to significantly different temperatures of condensation. The desired components condense in accordance with the partial pressures and can be precipitated. The above-mentioned components can then preferably be reused, and in particular, the refrigerant produced can be fed back into the refrigerant circuit.

The aforementioned object is also achieved by a method of operation of the thermal working machine with an evaporator, a condenser, a compressor, a throttle element in which a refrigerant as described above is used as the refrigerant.

BRIEF DESCRIPTION OF THE DRAWINGS

Further embodiments of the invention will become apparent from the description and the drawings. Exemplary embodiments of the invention are shown in simplified form in the drawings and explained in more detail in the subsequent description. The figures show the following.

DETAILED DESCRIPTION OF THE PARTICULAR EMBODIMENTS

Figure 1:
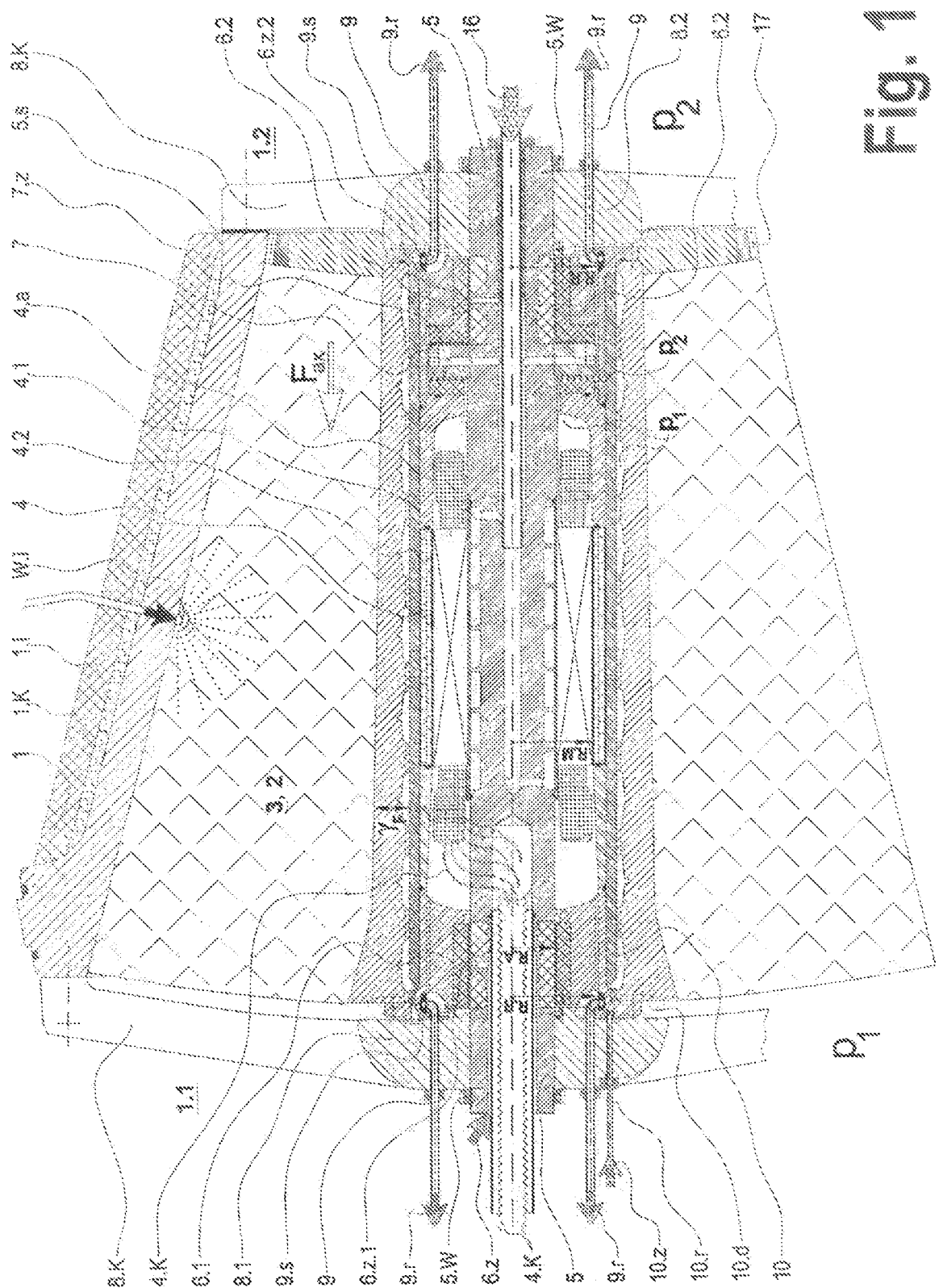
FIG. 1 shows a longitudinal section through a spindle rotor of a 2-shaft rotary displacement machine with a sliding bearing.

FIG. 1 shows by way of example a longitudinal section through a spindle rotor 3, 2 and applies to the features according to the invention for the 3z spindle rotor 3 and for the 2z spindle rotor 2, for which reason the reference sign 3, 2 has been selected on the spindle rotor. The axial force $F_{ax}$, which arises during operation in each spindle rotor due to the pressure difference $\Delta p$ of the compressor as $\Delta p = p_2 - p_1$, is specified and is absorbed by the axial refrigerant sliding bearing 7. Also, with reference to FIG. 3, the so-called "bearing play", i.e. the height of the gap in sliding bearing gap 6.s, lies in the range of a few μm, for example in the range from 15 to 35 μm for a sliding bearing gap radius R.A=20 mm. Ceramic is preferably selected as the material for the sliding bearing bush 6.b, and the counter surface 6.g on the stationary support shaft is selected in such a manner that friction and wear are minimal.

With reference to FIG. 1, the outlet-side pressurized refrigerant flow 16 first flows to the motor axle refrigerant cooling 4.a and then to the axial 7 and to the radial refrigerant sliding bearing 6 via the pressurized refrigerant inlets 7z and 6z, whereby the quantity of refrigerant necessary for each bearing is obtained through an appropriate number and cross-section of these inlets. Nevertheless, it is naturally also possible for some applications that the motor cooling system refrigerant for cooling the axle with refrigerant 4.a has its own inflow and outflow and the pressurized refrigerant feeds 7.z and 6.z for the axial refrigerant sliding bearing 7 and the radial refrigerant sliding bearing 6 are separate if, for example, the refrigerant temperatures for the refrigerant sliding bearings need to satisfy certain conditions and the temperature requirements for engine cooling and refrigerant sliding bearing are too far apart from each another. Therefore, the figure shown is only an example.

The internal rotor cooling system 10 shown is only necessary for specific applications when there are special requirements on the structural heat balance because the refrigerant on the rotating inner wall flowing from R.M to R.R will dissipate a considerable amount of heat from inside the rotor by way of its evaporated fraction.

Figure 3:
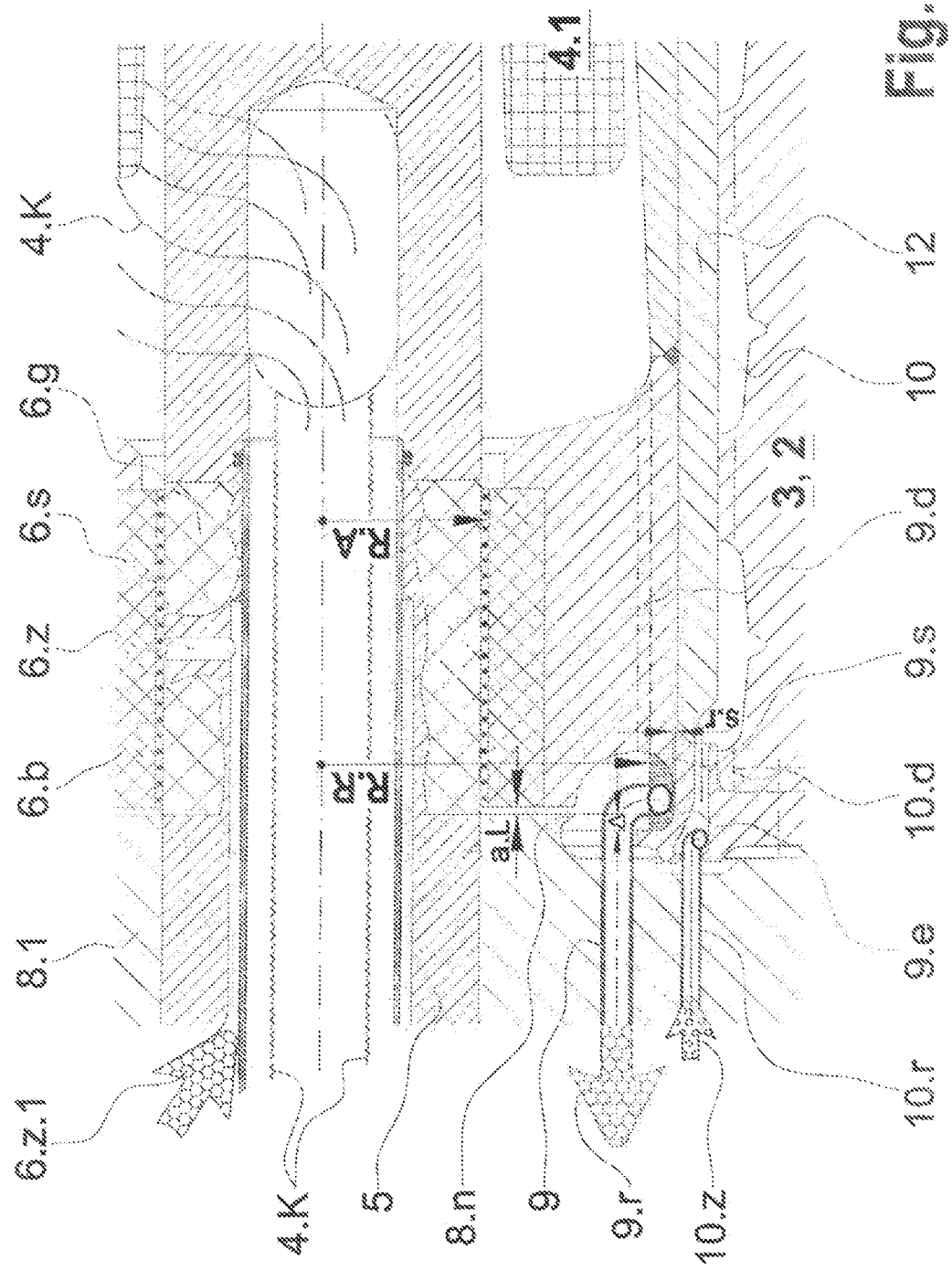
FIG. 3 shows an enlarged view of the inlet area of the 2-shaft rotary displacement machine shown in FIG. 1.
Figure 4:
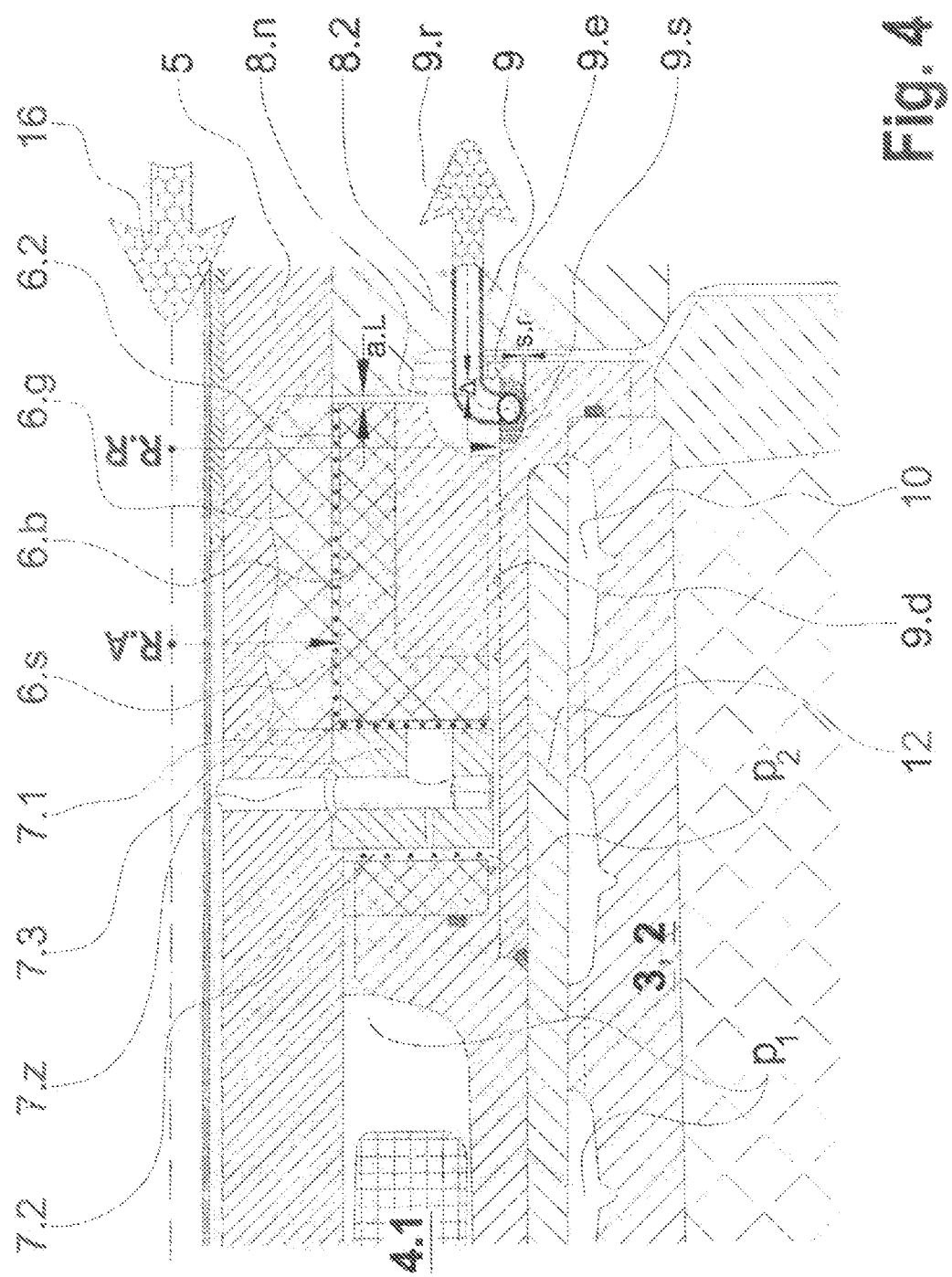
FIG. 4 shows an enlarged view of the outlet area of the 2-shaft rotary displacement machine shown in FIG. 1.

The inlet area is shown in more detail in FIG. 3, and the outlet region is shown in more detail in FIG. 4.

Figure 2:
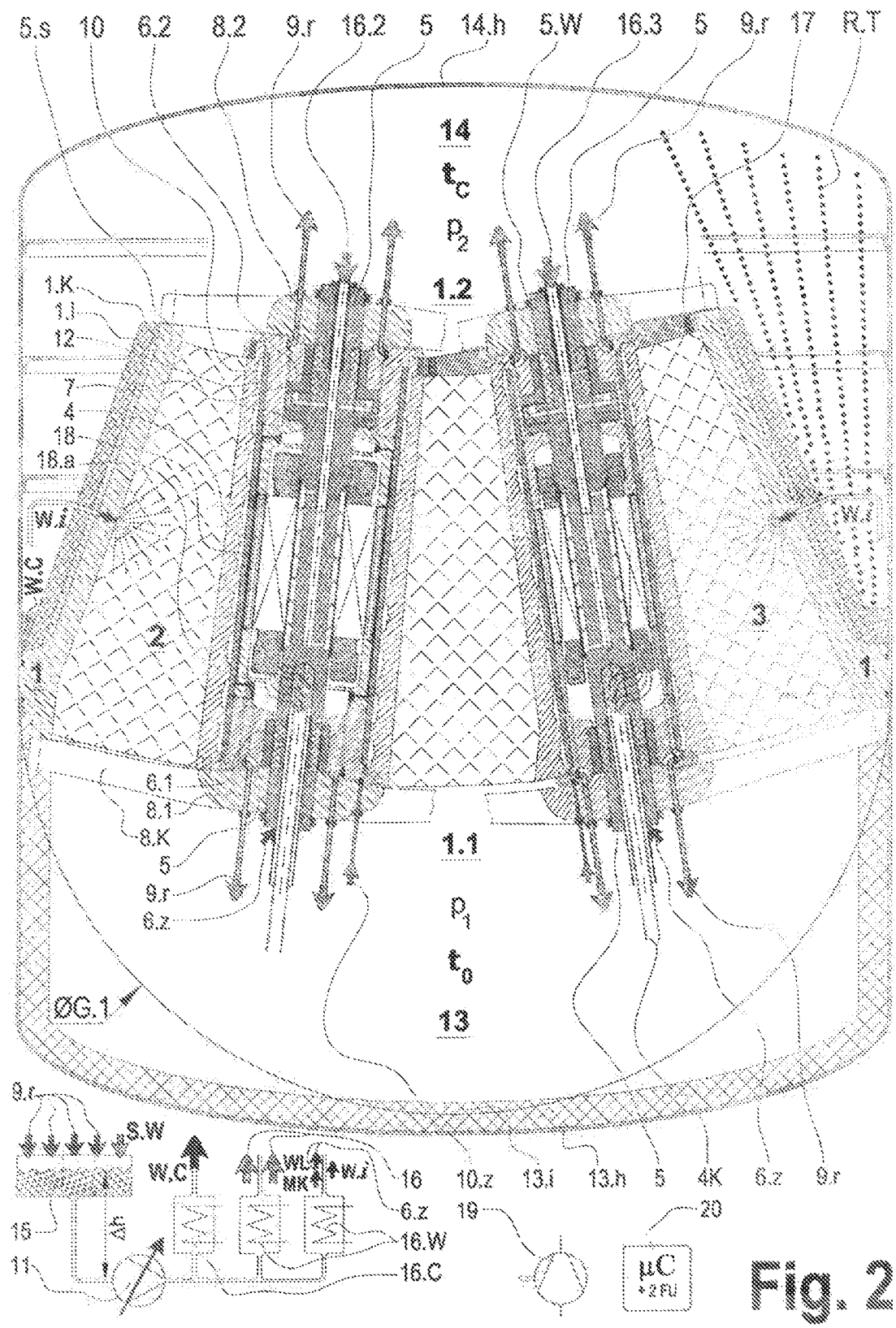
FIG. 2 shows a longitudinal section through an overall positive displacement compressor system for a stationary design and sliding bearing.

FIG. 2 shows by way of example a longitudinal section through an overall displacement compressor system in the case of a stationary design with the spindle rotor pair 2 and 3 in the surrounding compressor housing 1 and the stationary continuous support shafts 5 for each spindle rotor 2, 3, which are supported on both sides on the inlet 1.1 as well as on the outlet 1.2 of the compressor housing 1 by axle supports 8.

In the embodiment of the drive motor 4 with respect to the pitot tubes 9 carrying the refrigerant away at each end of the spindle rotor, it is always the goal to allow the refrigerant to flow into the collection channels 9.s due to centrifugal force. Consequently, the motor gap radius R.M is therefore always smaller than the radius of the refrigerant collection channel, i.e. R.M<R.R in particular along the entire refrigerant flow path as well. This condition is fulfilled by way of example in FIG. 2 for the 3-toothed spindle rotor 3, but is not fulfilled for demonstration purposes on the 2z rotor 2 in that the case R.M>R.R is shown there, for example, when a very powerful motor 4 is required. It is then possible to provide a corresponding siphon connection 18 for transferring refrigerant to the motor rotor 4.2, whereby it is ensured through an outlet hole 18.a that no residual refrigerant accumulates in the motor gap between the motor stator 4.1 and the motor rotor 4.2, thus producing inadmissible friction in the motor area in that this unavoidable residual refrigerant flows off or partially evaporates in the motor region via the outlet hole 18.a. In this case, the entire motor 4 is subjected to the pressure $p_1$ and thus experiences good heat dissipation due to the high evaporation enthalpy so that the efficiency of the motor 4 is improved.

The circular arc with ØG.1 is shown in FIG. 2 folded in to demonstrate the cylindrical transition region on the compressor housing 1 and serves as separation between the evaporation chamber 13 and the condensation chamber 14 on the compressor housing 1 in this preferably cylindrical region.

The regulation on the refrigerant pump 11 of the pressure and flow rate is represented by an arrow in FIG. 2 that points through the symbol used for a refrigerant pump. In addition to the pressure and flow rate, the temperature level of the corresponding refrigerant flow is then controlled for each operating point via the heat exchangers 16.W. The following designations apply in this case:

WL stands for refrigerant fed to the refrigerant sliding bearings 6 and 7.

Δh stands for the height at which the collecting chamber 15 is located above the refrigerant pump 11.

MK stands for the refrigerant used for engine cooling 4.a.

S.W stands for the system refrigerant used to fulfill the refrigeration task.

W.i stands for the refrigerant injected into the working chamber.

W.C stands for condensed refrigerant from condensation chamber 14.

The condensed refrigerant W.C is fed to an external heat exchanger 16.C for the frequently desired "direct condensation" for dissipating heat in that part of this condensed refrigerant is used for direct contact condensation after its external heat has been removed for the purpose of maximizing its surface area as a "raindrop forest" R.T. In FIG. 2, this "raindrop forest" R.T is only shown in the condensation chamber 14 in simplified form on one side for the purpose of representation, but is actually implemented throughout the entire condensation chamber 14.

The potential problem relating to frost protection for the condensed refrigerant W.C to be cooled by the external heat exchanger 16.C is preferably solved in such a manner that, when not in operation, the residual condensed refrigerant still present in the lines flows back, for example, into the normally frost-proof inner region and/or is provided with sufficient expansion spaces that do not lead to material damage from the formation of ice due to expansion.

The following applies in general to the designations selected: Inlet side with index 1 and outlet side with index 2, as well as the following index 2 for the 2z rotor and the following index 3 for the 3z rotor, so that the following designations apply to the respective pressure refrigerant supply for each spindle rotor and each pressure side:

6.z.1.2=Refrigerant supply on the inlet side to the 2z rotor 6.z.1.3=Refrigerant supply on the inlet side to the 3z rotor On the outlet side, the 6.z refrigerant supply is a partial flow of the pressurized refrigerant 16

6.z.2.2=Refrigerant supply on the outlet side to the 2z rotor 6.z.2.3=Refrigerant supply on the outlet side to the 3z rotor In the case of the pressurized refrigerant 16 shown on the outlet side 1.2, the following designations are used for each spindle rotor:

16.2=Pressurized refrigerant to 2z rotor 2

16.3=Pressurized refrigerant to 3z rotor 3

Distribution between 7.z and 6.z for each spindle rotor is achieved via the cross-sections and number of holes in the feed lines. As a result of the ability to control each refrigerant flow in terms of the flow rate, pressure, and temperature, the most efficient operating mode, i.e. the operating mode with the lowest overall energy requirement, is achieved during operation. In the following FIGS. 3 and 4, the two ends of the spindle rotor, meaning the inlet and outlet sides, are also shown in an enlarged view.

The exemplary sectional diagram in FIG. 3 as a detailed enlargement of FIG. 1 shows, in the inlet area 1.1 for the 2z rotor 2 and the 3z rotor 3, the radial refrigerant sliding bearing 6.1 with the pressurized refrigerant supply 6.z.1 and 6.z in the sliding bearing gap 6.s, which is only a few µm wide, with the support length a.L, which is smaller by at least a factor of 3 to 5 than the sliding bearing radius R.A.

In addition, the figure shows the gap s.r set at the pitot tube end 9.e for the purpose of positioning the pitot tube in order to adjust the pitot tube refrigerant conveyed in terms of its pressure and quantity with the known rotational speed dependency on each pitot tube 9 through the immersed cross-section, whereby the ends of a plurality of pitot tubes 9 are preferably immersed in each collection channel 9.

The distance Δ from the drip nose 8.n ensures, depending whether the compressor is installed in a standing or lying position, that leaked refrigerant is returned to the collection channel 9.s.

As shown by way of example in FIG. 4 as an enlarged diagram of FIG. 1 for the outlet region 1.2, the pressure refrigerant supplied 16 flows first to the motor axle refrigerant cooling 4.a and then as a pressurized refrigerant supply 7z to the axial refrigerant sliding bearing 7, and as a pressurized refrigerant supply 6z to the radial refrigerant sliding bearing 6.2 on the outlet side.

In this case, the main axial refrigerant sliding bearing 7.1 bears the axial force $F_{ax}$ with the thrust bearing 7.2 via the support ring 7.3, which is fixed in place and on the frame, to axially secure each spindle rotor in the longitudinal direction of the rotor.

In this case, motor axle refrigerant cooling 4.a can naturally be achieved using a separate circuit as an alternative via an additional inner tube for separate supply and discharge, and the pressurized refrigerant inlets 6z and 7z for the axial refrigerant sliding bearing and for the radial refrigerant sliding bearing on the outlet side can be executed separately, and independent from the motor axle refrigerant cooling 4.a, if, for example, special temperature requirements need to be met.

In addition to the descriptions of FIGS. 1 to 4, the following list of reference signs and the list of identifiers contain further explanations of the individual components:

List of reference signs in FIGS. 1-4:

1 Compressor housing with an inlet side 1.1 with pressure $p_1$ and an outlet side 1.2 with pressure $p_2$, on the inlet side a min. of 15% greater distance between the spindle rotor axes than on the outlet side, whereby the compressor housing preferably simultaneously separates the evaporation chamber 13 with the pressure $p_1$ and evaporation temperature $t_0$ from the condensation chamber 14 with the pressure $p_2$ and condensation temperature $t_c$ via a preferably cylindrical ØG.1 housing shape in this area, whereby the compressor housing cooled for some applications by cooling flow 1.K is preferably provided with insulation 1.i to the condensation chamber 14.

- 1.1 Compressor inlet side during operation with the pressure $p_1$
- 1.2 Compressor outlet side during operation with the pressure $p_2$
- 1.K Housing cooling flow
- 1.i Housing insulation

2 Spindle rotor, preferably with 2-toothed gas-conveying outer threads, which is preferably comprised of an aluminum alloy, referred to briefly as the "2z rotor", and which is supported on its own support shaft 5 on each front end via refrigerant sliding bearing bushes 6.

3 Spindle rotor, preferably with 3-toothed gas-conveying outer threads, which is preferably comprised of an aluminum alloy, referred to briefly as the "3z rotor", and which is supported on its own support shaft 5 on each front end via refrigerant sliding bearing bushes 6.

4 External rotor motor as a drive machine for each spindle rotor, preferably designed as a synchronous motor, which is positioned between the two spindle rotor bearings 6 inside the rotor, i.e. below the root circle of the gas-conveying external thread, whereby the motor cables 4.K are guided out of the compressor via a central hole in the support shaft 5, and also with electronic motor pair synchronization 20 for non-contact operation of the spindle rotor pairing during operation

- 4.1 Motor stator with motor cables 4.K and preferably cast motor windings, whereby the stator package is seated rotatably and stationarily on each support shaft 5 and is preferably under the pressure $p_1$ and the motor heat loss is dissipated via the pressure refrigerant flow 16 by the motor axle refrigerant cooling 4.a.
- 4.2 Motor rotor connected to the respective spindle rotor 2, 3 for rotation therewith, preferably designed with permanent magnets, with the inner radius R.M and correspondingly secured with respect to the centrifugal forces
- 4.a Motor axle refrigerant cooling
- 4.K motor cable

5. The support shaft, which is stationary and fixed to the frame, for each spindle rotor is held continuously over the entire length of the rotor and on each side by axle supports 8.1 and 8.2, which are supported on the compressor housing 1, whereby the axial position of each spindle rotor in the compressor housing is adjusted, preferably via shaft nuts 5.W at each end of the support shaft 5 and/or via peeling disks 5.s between the axle supports 8 and the compressor housing 1 for the targeted adjustment of the play.

- 5.s Peeling disks
- 5.W Shaft nuts

6 Radial refrigerant sliding bearing as a-sliding bearing with the process refrigerant as a lubricating medium for absorbing the spindle rotor radial forces with a rotor-fixed, rotating sliding bearing bush 6.b with a short supporting length a.L, where "short" means preferably smaller than the sliding bearing radius R.A in the sliding bearing gap 6.s at least by a factor of approximately 3 to 5, and a preferably specifically adapted counter surface 6.g on the support shaft 5 and with a pressurized refrigerant supply 6.z, whereby a ceramic material is preferably selected as the sliding bearing material.

- 6.1 Radial refrigerant sliding bearing on the compressor inlet side 1.1, where the pressure $p_1$ prevails
- 6.2 Radial refrigerant sliding bearing on the compressor outlet side 1.2, where the pressure $p_2$ prevails
- 6.b Plain bearing bush, mounted at each end of the respective spindle rotor 2, 3 for rotation therewith
- 6.g Counter surface on the support shaft 5 fixed to the frame
- 6.s Sliding bearing gap between the sliding bearing bush 6.b and the counter surface 6.g
- 6.z Pressurized refrigerant supply lines to the radial refrigerant sliding bearing

7 Axial refrigerant sliding bearings to absorb the axial forces of each spindle rotor

- 7.1 Main axial refrigerant slide bearing to absorb the axial forces, which are produced during operation of the compressor by the pressure difference $\Delta p = p_2 - p_1$ and, depending on whether the compressor is installed in a vertical or horizontal position, by the force of weight.
- 7.2 Axial refrigerant sliding thrust bearings for axial counter-positioning of the rotor and as thrust bearings for the main axial refrigerant slide bearing 7.1, whereby the pressure $p_1$ is applied to this bearing point on the smaller inner diameter and the pressure $p_2$ prevails on the outer diameter, which means the necessary pressure separation in the preferably continuous support shaft 5 is achieved.
- 7.3 A support ring firmly connected to the support shaft with pressure refrigerant inlets 7.z for each axial sliding bearing surface, whereby the respective pressure refrigerant quantity is adjusted specifically for each refrigerant sliding bearing via the cross-sections and the number of said inlets.
- 7.z Pressurized refrigerant supply lines to the axial refrigerant sliding bearing Axle supports for fixing and mounting each end of the support axle designed with support on the compressor housing 1 on the outlet side as 8.2 and on the inlet side as 8.1 via cantilever arms 8.K, in particular to enable the passage of the conveying medium in inlet 1.1.

- 8.K Cantilever arms
- 8.1 Cantilever arms on the inlet side
- 8.2 Cantilever arms on the outlet side
- 8.n Drip nose

9 Pitot tubes for returning 9.r the bearing lubrication refrigerant emerging from the sliding bearings and having a collection channel 9.s for collecting this refrigerant via the passage openings 9.d, which allow both the refrigerant and the refrigerant vapor to flow from the inside of the rotor axle space, with formation of the centrifugal refrigerant ring, into which the bent ends of the pitot tubes 9.e are immersed in a targeted manner, wherein the quantity of refrigerant 9 to be fed back to the collecting container 15 is adapted via the number, cross-section, and respective immersion depth of the pitot tubes, and to which leakage refrigerant is also supplied at a distance Δ from the dripping nose 8.n of the collection channel 9.s, and whereby the quantity of refrigerant to be discharged is adjusted by varying the immersion depth and corresponding design of the cross-section, wherein the bent pitot tube end 9.e specifically allows both the assembly and the positioning, in particular of the immersion depth with the gap s.r from the bottom of the channel.

9.d Passage openings
9.e End of pitot tube
9.r Refrigerant return by means of a pitot tube
9.s Collection channel 10 Internal rotor evaporator cooling for all applications with special temperature requirements designed cylindrically under the pressure $p_1$ with a targeted refrigerant supply 10.z via feed tube 10.r and steam outlet 10.d on the inlet side 1.1

10.d Steam outlet
10.r Feed tube
10.z Refrigerant supply

11 At least one refrigerant pump is externally separately regulated with pressure refrigerant to supply the sliding bearings in terms of the pressure and flow rate, for example with 7 bar at 6 liters/min., wherein the axial sliding bearing 7 usually requires more refrigerant than the radial sliding bearing 6, which is achieved by way of the design with respect to the diameter and number of feed holes 6.z and 7.z, whereby the refrigerant pump 11 initially supplies the refrigerant sliding bearings 6 and 7 with the required refrigerant quantity, in particular when starting the compressor, to form the so-called "hydrostatic" lubricating film, which is important particularly when starting for a radial bearing having a vertical axis and a rotating bush because the hydrodynamic lubricating film is formed by the rotational movement, in contrast to the case of a centrally rotating shaft. The refrigerant pump 11 operates from the collection tank 15, which is s arranged geodetically at a height of 6.h above the refrigerant pump 11, wherein the refrigerant pump 11 is relieved by the pitot tube pumps 9 as the compressor speed increases in that the pitot tube pumps 9 increasingly build up more refrigerant pressure depending on the rotational speed.

12 Support tube for generating the required bending stiffness, in particular through the choice of material, for example as stainless steel for each spindle rotor rotation unit, whereby the spindle rotor body with outer threads, preferably made of an aluminum alloy, is preferably supported on the outside on this support tube for rotation therewith, and whereby the inside of this support tube holds the refrigerant sliding bearings as well as the motor rotor 4.2 to introduce the drive power into the spindle rotor in order to fulfill the task of the compressor.

13 Evaporation chamber, which during operation is under the pressure $p_1$ and is held in this region by means of a compressor pot cover 13.h on the compressor housing 1, which is preferably designed to form a seal via the ØG.1 compressor housing design and provided with thermal insulation 13.i.

13.h Evaporation chamber pot cover
13.i Evaporation chamber insulation

14 Condensation chamber, which during operation is under the pressure $p_2$ and is held in this region by means of a compressor pot cover 14.h on the compressor housing 1, which is preferably designed to form a seal via the ØG.1 compressor housing design.

14.h Condensation chamber pot cover

15 Collection tank for the process refrigerant, which is geodetically positioned at Δh over the refrigerant pump 11, preferably not only for the refrigerant return 9.r, but also for the system refrigerant S.W 16 Pressure refrigerant flow conveyed by the refrigerant pump 11 and supplied centrally at the outlet-side end of each support shaft 5, whereby this refrigerant preferably flows first through the motor axle refrigerant cooling 4.a and then via supply lines 7.z to the axial refrigerant sliding bearing 7 as well as via the feed 6.z to the outlet-side radial refrigerant sliding bearing 6.2 on each spindle rotor, whereby the refrigerant feed 6.z is also regulated by the refrigerant pump on the inlet-side end of each support shaft under the required pressure and flow rate, whereby the refrigerant temperature of each partial flow is specifically adjusted for the application in a targeted manner by means of heat exchangers 16.W in order to optimize the performance, and in addition the refrigerant pump also injects refrigerant via the refrigerant injector W.i with formation of a spray mist into the compressor working chamber to increase the compressor efficiency, whereby the refrigerant pump 11 can be controlled in a targeted manner for the various operating conditions, represented by the arrow in the symbol with respect to the flow rate and pressure generated, whereby each heat exchanger 16.W adjusts the refrigerant temperature to each operating point in each of said pressurized refrigerant partial flows in order to achieve the lowest total energy requirement.

16.C Heat exchanger for external heat dissipation through "direct condensation" via cooling for condensed refrigerant W.C, which is then returned as a "raindrop forest" R.T for direct contact condensation in the condensation chamber 14.

16.W Heat exchangers in the pressure refrigerant supply lines at the following locations:
Pressurized refrigerant supply 6.z.1 to the radial refrigerant sliding bearing 6.1 on the inlet side
Pressurized refrigerant supply 6.z.2 to the radial refrigerant sliding bearing 6.2 on the outlet side
Pressurized refrigerant supply 7.z to the axial refrigerant sliding bearing 7
Pressurized refrigerant supply 16 to the motor axle refrigerant cooling 4.a
Pressurized refrigerant supply W.i for injection into the working chamber of the compressor as well as application-specifically with a targeted cooling refrigerant supply to the following locations:
Internal rotor cooling 10
Housing cooling 1.K 17 Emergency synchronization gear if, for example in the event of a power failure, the electronic motor pair/spindle rotor synchronization initially enters the generator operating mode to slow down synchronously, i.e. without mechanical contact between the spindle rotors, but when the kinetic energy at low rotational speeds is no longer sufficient to supply power, in which case this emergency synchronization gear ensures that critical contact between the working chamber flanks of the gas-conveying external thread of the two spindle rotors 2 and 3 is avoided, whereby in the embodiment of the electronic motor pair/spindle rotor synchronization 20 there are also solutions in which this emergency synchronization gear is omitted, meaning it is not installed at all.

18 Siphon connection to the refrigerant bypass on the motor with outlet holes 18.a leading to the inlet side in the event that the motor 4 is designed to be larger, i.e.

when R.M>R.R. However, when designing the motor in particular, the following condition is preferably to be applied: R.M<R.R 19 Vacuum pump with corresponding refrigerant steam compatibility for generating the negative pressure in the overall refrigerant system, in particular for pumping out carrier gases that have penetrated into the overall refrigerant system as an evacuation process when the machine is not operating.

20 Electronic motor pair/spindle rotor synchronization as a block box labeled µC+2FU and shown with the microcontroller as µC, which controls the two frequency converters referred to as FU in a regulated manner of each drive motor 4 for each spindle rotor 2 and 3 in such a manner that the two spindle rotors operate in opposite directions of rotation and without contact during operation.

List of the labels of FIGS. 1-4:

ØG.1 The diameter of the compressor housing 1 in the preferably cylindrical separating region of the evaporation chamber 13 and the condensation chamber 14 a.L Supporting length between the sliding bearing bush 6.b and the axle support 8, whereby the value for a.L is preferably smaller by a factor of at least 3 to 5 than the sliding bearing gap radius R.A Δ Distance between the drip nose 8.n and the collection channel 9.s in order to supply leakage refrigerant to the collection channel 9.s in a vertical or horizontal position depending on the installation orientation of the compressor machine Δh Stands for the height at which the collection tank 15 is located above the refrigerant pump 11.

$F_{ax}$ Axial forces per spindle rotor resulting from the difference in pressure between $p_2$ and $p_1$ as well as the rotor weight forces, which depend on the orientation of the compressor R.A Radius in the sliding bearing gap 6.s on the radial refrigerant sliding bearing 6

R.M Inner radius, also known as the air gap radius, of the motor rotor 4.2, which is preferably always designed to be smaller than the radius of the refrigerant collection channel R.R. Radius with respect to refrigerant collection channel, which is conveyed by a plurality of pitot tubes 9 as a return flow 9.r, whereby the value of R.R is preferably not designed to be smaller than R.M so that in the motor region the refrigerant is driven by centrifugal force to each collection channel 9.s on each spindle rotor end R.T Raindrop forest as surface maximization for direct contact condensation in condensation chamber 14 s.r Gap between the respective pitot tube end 9.e and the bottom of the collection channel 9.r S.W System refrigerant for fulfilling the core task of the refrigerant displacement compressor system:
  Evaporation with heat absorption in the evaporation chamber 13 at the pressure $p_1$
  Compression of refrigerant from the pressure $p_1$ to the pressure $p_2$ in the displacement machine with the two counter-rotating spindle rotors 2 and 3
  Condensation is preferably performed as "direct condensation" with heat transferred in the condensation chamber 14 at the pressure $p_2$ W.C Condensed refrigerant for "direct condensation" is cooled via the external heat exchanger 16.c and then returned as a "raindrop forest" R.T to the condensation chamber 14 for direct contact condensation at the pressure $p_2$ W.i Coolant injection into the compressor working chamber, preferably as a fine spray mist and approximately in the region of one half the rotor length ±30%

Figure 5:
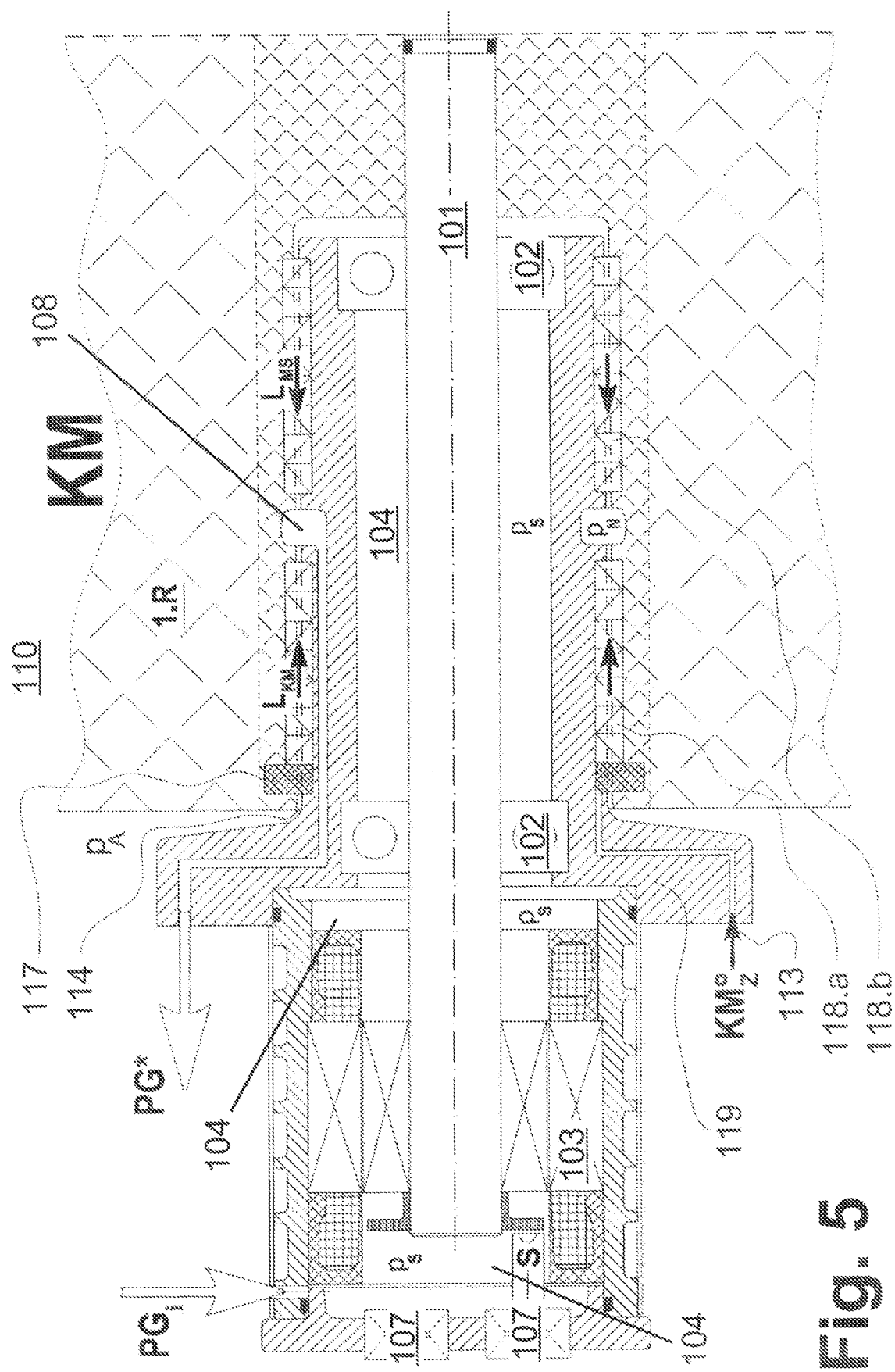
FIG. 5 shows a section of a spindle rotor of a 2-shaft rotary displacement machine with a longitudinal section of a rolling bearing.

FIG. 5 shows by way of example a working chamber shaft bushing 114 with a one-sided spindle rotor bearing as a so-called "cantilever" rotor bearing, which is drawn into the spindle rotor body 101.R, preferably via the bearing cartridge 119, in order to increase the critical bending speed. In this exemplary embodiment, the known rolling bearings 102 are used in the rotor bearing, the grease or oil lubrication of which is generally to be protected from a refrigerant having a refrigerant component with a hydroxyl group. For this purpose, the following are provided in addition to the neutral chamber 108 with a pressure $p_N$:

On the one side, a flow braking system 118.a on the working chamber side with the leakage refrigerant flow $L_{KM}$ to be minimized flowing from the compressor working chamber 110 at the pressure $p_A$ on the shaft hole 114

On the other side, flow braking system 118.b on the side of the side space with the side space leakage flow LMS from the side space 104, the pressure $p_S$ of which is adjusted via the supply of $PG_i$.

Through targeted extraction of PG* from the neutral chamber 108 and regulated supply of $PG_i$ into the side space 104, the following pressure condition is constantly satisfied:

$$p_S > p_A > p_N.$$

For the desired minimization of the leakage refrigerant flow $L_{KM}$, a blocking steam chamber 117 with a supply from $KM°_z$ can preferably or optionally be set up in the flow braking system 118.a on the working chamber side, whereby the quantity of the leakage refrigerant flow $L_{KM}$ can be adjusted in a targeted manner via regulation of the quantity of $KM°_z$ supplied. The blocking steam chamber 117 is shown in more detail in FIG. 6.

Figure 6:
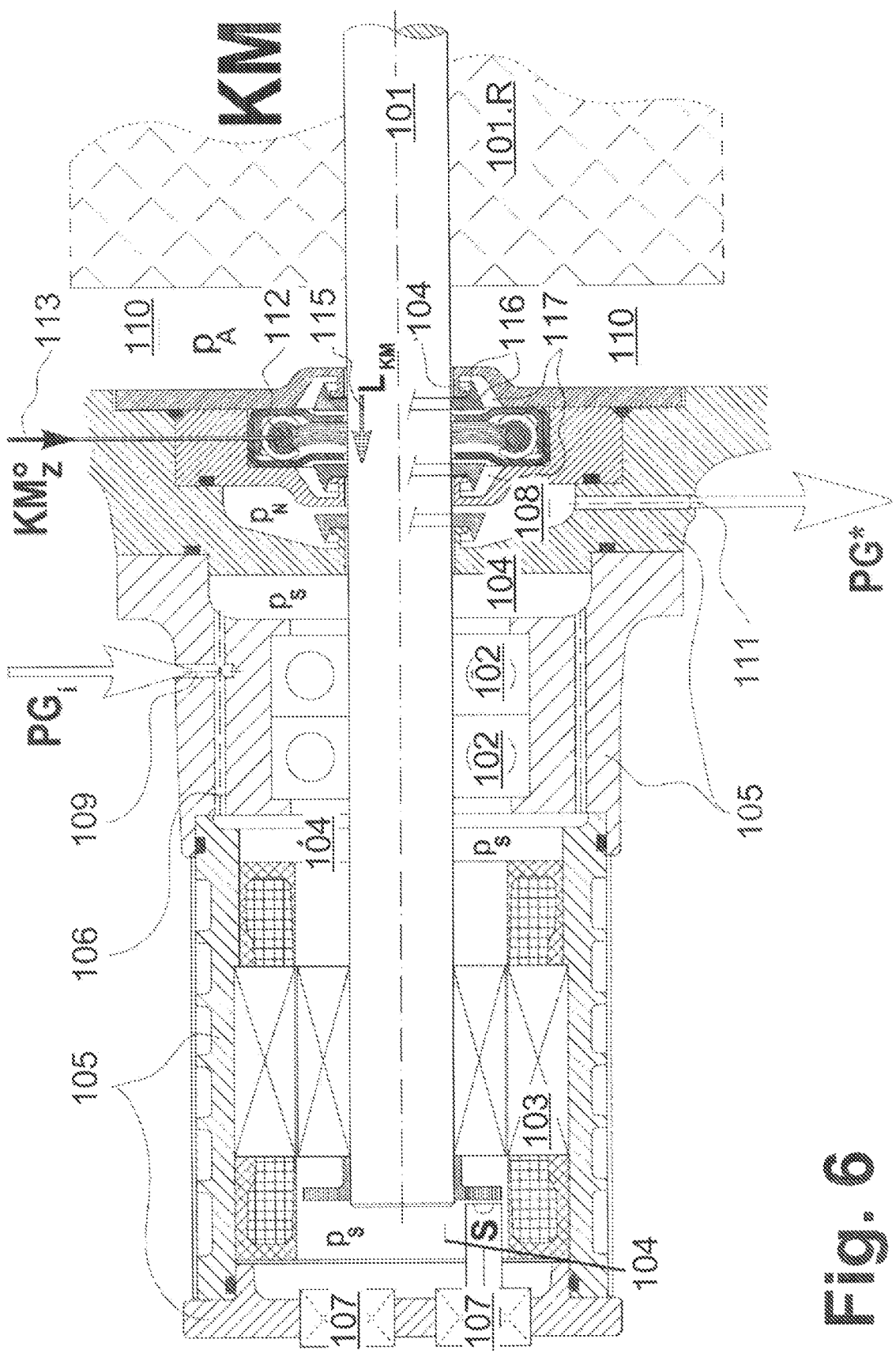
FIG. 6 shows a section of a spindle rotor of an alternative 2-shaft rotary displacement machine with a longitudinal section of a rolling bearing.

FIG. 6 shows, by way of example, a simple working chamber shaft bushing 112 for a two-sided spindle rotor bearing with grease-lubricated or oil-lubricated rolling bearings 102, whereby a brush seal 112 with the supply of $KM°_z$ and the leakage refrigerant flow $L_{KM}$ is shown in greater detail in the blocking steam chamber 117. The high increase in volume due to evaporation achieved by means of the specifically supplied amount of $KM°_z$ in that the thermal energy required for evaporation is generated by the friction of the bristles, which leads to the corresponding pressure increase due to the limited volume of the blocking steam chamber 117, is achieved in a controlled manner for the desired blocking effect for the leakage flow $L_{KM}$ in the sense of reducing or minimizing this flow.

Figure 7:
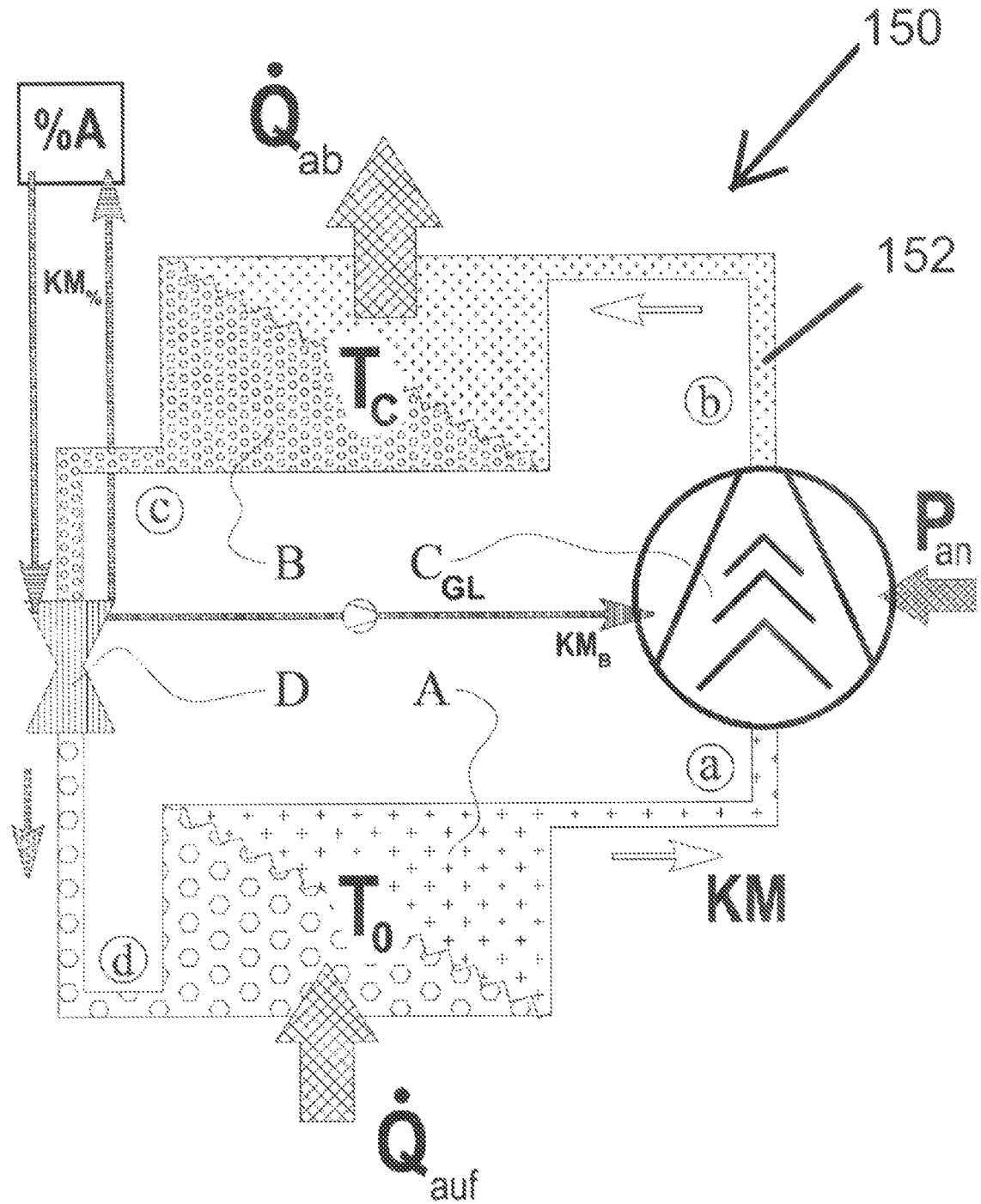
FIG. 7 shows a schematic diagram of a thermal working machine with a 2-shaft rotary displacement machine with a sliding bearing; and, FIG. 8 shows a schematic diagram of a thermal working machine with a 2-shaft rotary displacement machine with a rolling bearing.
Figure 8:
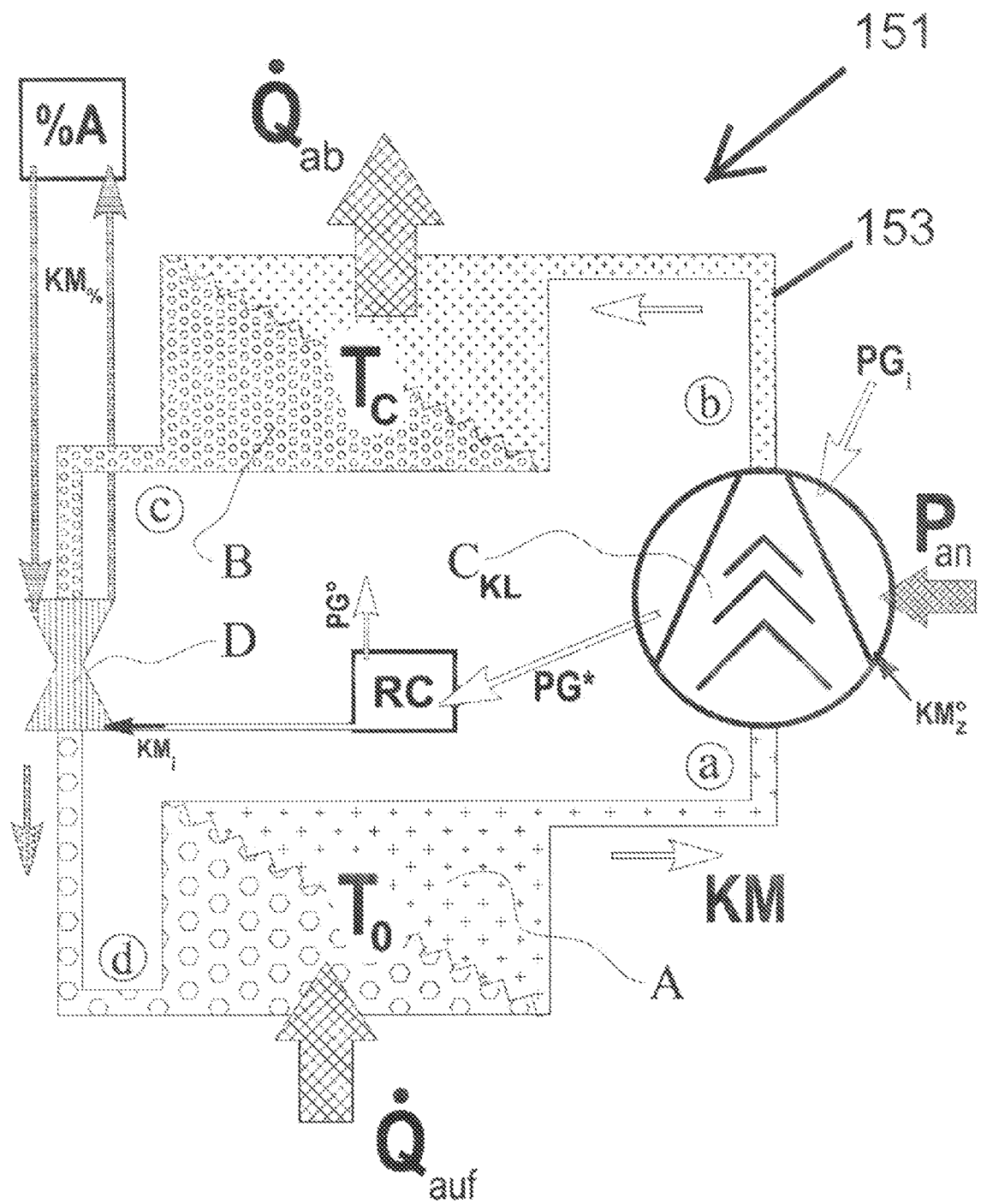

The leakage refrigerant flow $L_{KM}$ is to be minimized because this minimizes the loss of refrigerant KM for the process according to FIGS. 7 and 8. The shielding devices 116 in front of the shaft openings in this blocking steam chamber 117 ensure that excess refrigerant that has not evaporated yet and is thus still in the liquid state is sufficiently and simply kept away from the shaft openings, and thus continues to be subject to the process of evaporation in the blocking steam chamber 117.

FIG. 7 shows a simple representation of a thermal working machine 150 with a KM circuit 152 with the positive displacement compressor $C_{GL}$ with a sliding bearing according to FIGS. 1-4, and thus the simplest design with the lowest cost in that, for the sliding bearing of the compressor of type $C_{GL}$, a refrigerant with a refrigerant component with a hydroxyl group is used as the operating medium specifically for these compressor bearings via the refrigerant partial flow $KM_B$. The application-specific adaptation of the percentage of the refrigerant component with hydroxyl group is greatly simplified via the supply and discharge of the refrigerant partial flow $KM_{\%}$ to the refrigerant adjusting device %A, which can also be seen in FIG. 8.

FIG. 8 shows a simple diagram of a thermal working machine 151 with a KM circuit 153 with the positive displacement compressor $C_{KL}$ with rolling bearings. The measures required in the side chambers 4 to protect the components, in particular the bearings 2, are shown on this compressor type $C_{KL}$:

Supply of $PG_i$
Supply of $KM°_z$ as an option
Extraction of PG*

In this case, the supply of $PG_i$ into each side space 104 can be reduced to a minimum by the evaporation of $KM°_z$ in the blocking steam chamber 117 due to the closed side space. Primarily, the pressure $p_S$ in the side space 104 in this case must be monitored by extracting PG*, i.e. via suction, and by maintaining the aforementioned pressure condition in the compressor:

$$p_S > p_A > p_N.$$

By means of the recycling device RC, the extracted refrigerant components can be selectively condensed out of the PG* mixture and reused by feeding it back into the refrigerant circuit as a $KM_i$ flow, for example in the region of the throttle element D, if the respective expense is deemed worthwhile. Similarly, in particular in the case of oil lubrication for bearing 102, it is also possible in this manner to reuse extracted lubricant particles that have been extracted with the side space leakage flow $L_{MS}$ and, after condensation, are fed back to the bearing lubrication in side space 104.

In the case of the thermal working machines or refrigerant circuits shown in FIGS. 7 and 8, a water-based refrigerant KM is used that comprises a refrigerant component with a hydroxyl group, in particular ethanol. The proportion of refrigerant is, for example, 30%, but can also be lower or higher depending on the application. It is also possible to use a different alcohol, in particular a monohydric alcohol such as propan-1-ol, for example, instead of ethanol.

In this manner, said refrigerant comprising a mixture of water and a refrigerant component having a hydroxyl group is used as a refrigerant for a thermal working machine having an evaporator, a condenser, a compressor, and a throttle element.

The thermal working machines shown in FIGS. 7 and 8 are thus thermal working machines with an evaporator, a condenser, a compressor, a throttle element, and a refrigerant circuit with a refrigerant comprising a mixture of water and a refrigerant component with a hydroxyl group.

When operating the thermal working machines illustrated in FIGS. 7 and 8, a method for operating a thermal working machine with an evaporator, a condenser, a compressor, and a throttle element is thus performed in which a refrigerant comprising a mixture of water and a refrigerant component having a hydroxyl group is used as the refrigerant.

In addition to the descriptions of FIGS. 5 to 8, the following list of reference signs and the list of labels contain further explanations of the individual components:

List of reference signs in FIGS. 5-8:
  101 Support shaft with spindle rotor 101.R of the rotary displacement machine for compressing refrigerant in the compressor working chamber 110 with the corresponding working chamber pressure $p_A$ on each shaft hole 114
101.R Spindle rotor with external conveying thread as a rotary displacement body mounted on the support shaft 101 for rotation therewith
102 Bearing for the support shaft, for example as a hybrid rolling bearing, but preferably as a refrigerant sliding bearing
103 Drive motor for the support shaft 101 with a sensor S for electronic motor pair synchronization, whereby the motor windings of the drive motor stators are preferably cast
104 Compressor side space at the pressure $p_S$, enclosed by housing components 105 in the sense of a gas-tight seal and only connected to the compressor working space 110 via the shaft hole 114, whereby at least the bearing 102 is located in the side space as well as the drive motor 103 with the sensor S for each support shaft 101 in the case of electronic motor pair synchronization
105 Housing components to enclose the side space 104 in a gas-tight manner
106 Bypass hole to prevent harmful gas from flowing through bearing 102
107 Cable glands, gas-tight
108 Neutral chamber with the pressure $p_N$ between the side space 104 and the compressor working chamber 110 for discharging PG*
109 Supply of protective gas, also referred to as purge gas, as $PG_i$, preferably in the bypass hole 106
110 Compressor working chamber of the rotary displacement machine for compressing refrigerant
111 Discharge of PG* in such a manner that the leakage refrigerant flow $L_{KM}$ is set
112 Shaft seal, preferably as a brush seal, for sealing the shaft hole 114 between the working chamber 110 and the side chamber 104 with the task of minimizing the leakage refrigerant flow
113 Supply of $KM°_z$, preferably as pure water, to the blocking steam chamber 117
114 Shaft hole for the support shaft 101 as a connection between the side space 104 and the compressor working chamber 110
115 Leakage refrigerant flow $L_{KM}$, in particular in the blocking steam chamber 117
116 Shielding devices as multiple protection of the bearing from liquid components and to retain excess, i.e. unevaporated, refrigerant from the $KM°_z$ supply on the shaft holes
117 Blocking steam chamber with the supply of $KM°_z$ for $L_{KM}$ damping, for example with shaft seal 112 with targeted use of the increase in volume due to evaporation in a limited space, namely this blocking steam chamber
118 Flow braking system or flow resistance to increase the flow resistance of a shaft passage, for example designed as a narrow gap, preferably with flow interruption resistances such as the series connection of a plurality of grooves with edges as sharp as possible, blocking steam chamber, piston rings, threaded seals, or even centrifugal seals
118.*a* Flow braking system or flow resistance on the working chamber side
118.*b* Flow braking system or flow resistance on the side of the side spaces 119 Bearing cartridge for mounting the bearings 102 projecting into the spindle rotor 101.R in the case there is a so-called "cantilever" spindle rotor bearing on one side List of the labels of FIGS. 5-8:

KM Refrigerant in the circuit with the usual directional arrow information⇒at the following positions:
- a KM after leaving the evaporator A and before entering the compressor C
- b KM after leaving the compressor C and before entering the condenser B
- c KM after leaving the condenser B and before entering the throttle element D
- d KM after leaving the throttle element D and before entering the evaporator A A Evaporator with a heat absorption coefficient $\dot{Q}_{auf}$ at the process temperature $T_0$ B Condenser with heat transfer $\dot{Q}_{ab}$ at the process temperature $T_C$ C Compressor, preferably in the form of a displacement machine, with the power consumption $P_{an}$ as:
- $C_{GL}$ Displacement compressor with sliding bearings
  Displacement compressor with roller bearings, grease-lubricated or
- $C_{KL}$ oil-lubricated For the following pressure values in the compressor C:
Pressure in the working chamber 10 before the respective shaft hole to side space 4
Pressure in the neutral chamber 8 of each working chamber shaft
$p_N$ hole 14
$p_S$ Pressure in the compressor side space 4

D Throttle element

%A KM adjusting device for adjusting the refrigerant composition in percent in that the proportion of refrigerant with hydroxyl groups is adapted to the respective requirements and conditions depending on the application $PG_i$ Purge gas inlet as a supply of protective gas for the elements in side space 4

PG* Purge gas outlet as a practically permanent extraction process, which sets the leakage flow $L_{KM}$ by means of regulating the volume, in that the evaporation, and thus the flow resistance in the blocking steam chamber 117, are preferably regulated via the amount of $KM°_z$ supplied PG° Purge gas outlet on the recycling unit
Leakage refrigerant flow through the flow braking system 18.a on the side
$L_{KM}$ of the working chamber
Side space leakage flow through the flow braking system 18.b on the side
$L_{MS}$ of the side spaces
Partial flow of the refrigerant supply to the KM supply on the compressor $KM_B$ $C_{GL}$ with sliding bearings $KM°_z$ Supply, preferably of water, to the blocking steam chamber 117

$KM_i$ Supply of refrigerant KM, for example in the vicinity of the throttle element D, primarily as a compensation for the leakage refrigerant flows $L_{KM}$ coming from each of the shaft holes 14

$KM_{\%}$ Refrigerant partial flow for adjusting the refrigerant composition in percent with supply to and return from the KM adjustment device %A RC Recycling unit for the extracted PG* mixture by condensing the respective components S Sensor for electronic motor pair synchronization

What is claimed is:

1. A thermal working machine (150, 151) comprising an evaporator (A) connected in fluid communication with a condenser (B), a compressor ($C_{GL}$, $C_{KL}$), a throttle element (D), and a refrigerant circuit (152, 153) including a water-based refrigerant having a refrigerant component including a hydroxyl group and the refrigerant circuit (152, 153) including a refrigerant adjusting device (%A) for changing the refrigerant component including the hydroxyl group during the operation of the thermal working machine (150, 151).

2. The thermal working machine according to claim 1, characterized in that
said refrigerant component consists of an alcohol, in particular a monohydric alcohol, especially ethanol or propan-1-ol.

3. The thermal working machine according to claim 1, characterized in that
said refrigerant component comprises at least 10%, in particular at least 20%, and especially at least 30%, of the total amount of the refrigerant.

4. The thermal working machine according to claim 1, characterized in that
the proportion of the aforementioned refrigerant component having a hydroxyl group with respect to the total refrigerant is at most so high that the refrigerant is non-flammable.

5. The thermal working machine according to claim 1, characterized in that
all the electrical components of the thermal working machine are configured to be explosion-proof.

6. The thermal working machine according to claim 1, characterized in that
the compressor ($C_{GL}$) is configured as a 2-shaft rotary displacement machine having a first spindle rotor (3) that can be rotated about a first support shaft (5) and a second spindle rotor (3) that can be rotated about a second support shaft (5) and which are mounted by means of sliding bearings (6, 7) operated with the refrigerant.

7. The thermal working machine according to claim 6, characterized in that
the first spindle rotor (5) is driven by a first drive machine (4), the second spindle rotor (5) is driven by a second drive machine (4), and the said refrigerant is used to cool at least one of the first and the second drive machines (4).

8. The thermal working machine according to claim 6, characterized in that
the compressor ($C_{GL}$) has at least one pitot tube pump (9) for evacuating refrigerant fed to the compressor ($C_{GL}$).

9. The thermal working machine according to claim 8, characterized in that
the pitot tube pump (9) is fed via a collection channel (9.s) which extends around the corresponding support shaft (5) and is configured such that refrigerant located in the compressor ($C_{GL}$) collects in the collection channel (9.s) during operation of the compressor ($C_{GL}$).

10. The thermal working machine according to claim 1, characterized in that
the compressor ($C_{GL}$) is configured as a 2-shaft rotary displacement machine having a first spindle rotor (101.R) that can be rotated about a first support shaft (101) and a second spindle rotor (101.R) that can be rotated about a second support shaft (101) and which are mounted by means of rolling bearings (102) and wherein—the rolling bearings (102) are protected from contact with the refrigerant by feeding a supply of protective gas.

11. The thermal working machine according to claim 10, characterized in that
the compressor ($C_{KL}$) has a neutral chamber (108) from which the protective gas supplied is discharged, whereby evaporated refrigerant is fed to the neutral chamber (108) so that a mixture of protective gas and evaporated refrigerant is evacuated from the neutral chamber (108).

12. The thermal working machine according to claim 11, characterized in that
the compressor ($C_{KL}$) has a blocking steam chamber (117), to which refrigerant is fed and which evaporates there, which is connected to the neutral chamber (108).

13. The thermal working machine according to claim 11, characterized in that
protective gas is fed to the neutral chamber (108) via a flow resistance on the side of the side space (118.b) and/or evaporated refrigerant is fed to the neutral chamber (108) via a flow resistance (118.a) on the side of the working chamber.

14. The thermal working machine according to claim 11, characterized in that
a recycling device (RC), to which the mixture of protective gas and evaporated refrigerant discharged from the neutral chamber (108) is fed and which separates said mixture into protective gas and refrigerant.

15. The thermal working machine according to claim 14, characterized in that
the refrigerant accumulating in the recycling device (RC) is fed back to the refrigerant circuit (153).

16. A method of operation of the thermal working machine (150, 151) according to claim 1,
characterized in that a refrigerant according to claim 1 is used as the refrigerant.

* * * * *